May 25, 1965  R. D. AURANDT  3,185,062

CAMERA ACCESSORY

Filed Aug. 23, 1961

RICHARD D. AURANDT
INVENTOR
KENDRICK, SCHRAMM & STOLZY

BY A. Donald Stolzy

ATTORNEY 3,185,062
CAMERA ACCESSORY
Richard D. Aurandt, 2469 Wild Oak Drive,
Hollywood, Calif.
Filed Aug. 23, 1961, Ser. No. 133,386
7 Claims. (Cl. 95—53)

This invention relates to an attachment for photographic cameras, and more particularly to a support for shutter actuating mechanisms such as timers and cables.

Many cameras are not provided with supports whereby timers and cables may be used with them, and to the present time, no means have been made available to adapt some of such cameras for actuation by a timer or cable.

The above-described limited use of cameras and other disadvantages of the prior art are overcome, in accordance with the present invention, by providing a support for a shutter actuating mechanism for a camera having a movable projection for operating the shutter thereof. In accordance with the present invention, such a shutter may include a substantially U-shaped member having an upper leg to extend over the top of the camera, a medial portion to extend downwardly along the side of the camera, and a lower leg to extend under the bottom of the camera, the upper leg having means for connection with a shutter actuating mechanism, and a loop fixed to the member in a plane substantially perpendicular to the medial portion in a position under the upper leg to surround the projection.

Often, cameras are provided with a button-type movable projection for operating the camera shutter. In addition, cameras sometimes are provided with a fixed cylindrical projection to surround such a button. In such a case, the present invention may be mounted on the camera by placing the loop over the cylindrical projection and snapping the lower leg of the U-shaped member under the bottom of the camera.

In accordance with the present invention, the upper leg of the U-shaped member is provided with a tapped hole therethrough. Conventional timers and cables are provided with corresponding mating male threads, whereby the same may be threaded into the hole of the upper leg.

Thus, the device of the present invention may be constructed easily and quickly with a small number of inexpensive component parts.

In addition, the use of a strip of metal of rectangular cross section for the entire construction of the U-shaped member and the loop means that when the flat surface of the medial portion of the U-shaped member bears against the substantially flat side of the camera, the support of the invention is held in substantially fixed position. Translational movement of the support is prevented by the legs of the U-shaped member and the contiguous fit of the loop around the fixed projection of the camera. Rotation of the support about the axis of the movable projection of the camera is prevented by the fit of the flat surface of the medial portion of the U-shaped member against substantially flat side of the camera.

The above-described and other advantages of the present invention will be better understood from the following description when considered in connection with the accompanying drawings.

In the drawings, which are to be regarded as merely illustrative:

FIG. 1 is a perspective view of one embodiment of the invention shown attached to a camera for supporting a timer;

The support is again shown in FIG. 2 on a camera for supporting a cable;

A support made in accordance with the present invention is illustrated at 10 in all of FIGS. 1, 2, 4 and 5. A camera is illustrated generally at 11 in all of FIGS. 1, 2 and 3, camera 11 being provided with a shutter actuating button at 12 shown in FIG. 3, surrounded by a cylindrical projection 13 fixed to the body of the camera.

Figure 5:
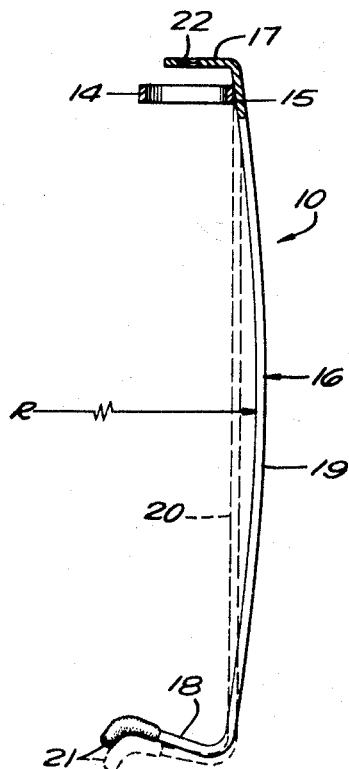
FIG. 5 is a side elevational view of the support as shown in FIG. 4.
Figure 4:
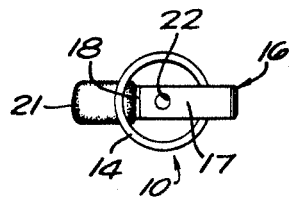
FIG. 4 is a top plan view of the camera support of the present invention.

As shown in FIGS. 4 and 5, support 10 is provided with a cylindrical loop 14 made of a strip of metal rectangular in cross section that is welded at 15 to a substantially U-shaped member 16 having upper and lower legs 17 and 18 respectively.

Upper leg 17 is substantially straight and extends above loop 14. Member 16 is provided with a medial portion 19 which is bent out at a rather large radius R, whereby it may be sprung to a position indicated by dotted lines at 20 for ease in affixing the support to camera 11.

Lower leg 18 is a leaf spring which is provided with a rubber pad 21 thereon to prevent camera 11 from being scuffed when support 10 is affixed thereto.

Figure 3:
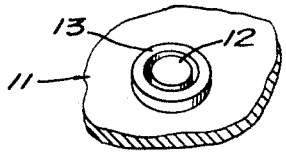
FIG. 3 is an enlarged broken away perspective view of a shutter actuating button and a fixed cylindrical camera projection surrounding the same.

When loop 14 of support 10 is located around projection 13 of camera 11, the springing of medial portion 19 to position 20 and the locating of leg 18 under the bottom of the camera results in loop 14 lying contiguous to the surface of camera 11 shown adjacent projection 13 in FIG. 3. Then permitting medial portion 19 to resume its unstressed shape results in pad 21 of lower leg 18 being pressed against bottom of the camera 11. While loop 14 and lower leg 18 contact the upper and lower surfaces of camera 11, upper leg 17 is spaced from the upper surface of button 12 and extends across a portion thereof above loop 14. Upper leg 17 is provided with a tapped hole at 22 into which a timer or cable release may be threaded.

Figure 1:
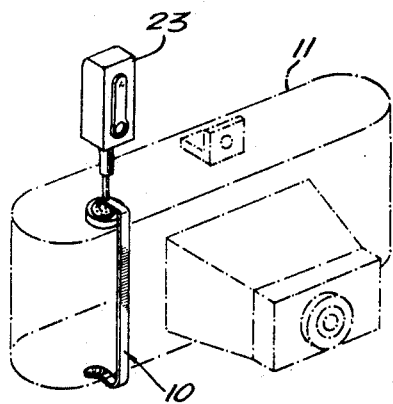
Figure 2:
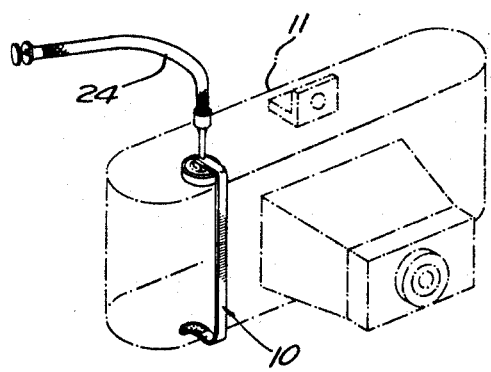

In the positions shown in FIGS. 1 and 2, support 10 lies most everywhere contiguous to the upper, lower and side surfaces of the camera 11, medial portion 19 of U-shaped member 16 lying contiguous to the side thereof.

Note will be taken that, as said previously, not only is loop 14 made of a strip of metal rectangular in cross section, but U-shaped member 16 is likewise made of a strip of metal of rectangular cross section, where the contiguous position of medial portion 19 thereof lies against the substantially flat side portion of camera 11 to maintain loop 14 and the remainder of support 10 in a substantially fixed rotatable position about the axis of button 12.

When support 10 is mounted on camera 11 as illustrated in FIGS. 1 and 2 and described hereinbefore, either a timer, for example as indicated at 23 in FIG. 1, or a cable release, as indicated at 24 in FIG. 2, may be threaded into the tapped hole 22 in the upper leg 17 of U-shaped member 16. Operation of either timer 23 or cable release 24 causes a steel shaft therein, which is conventional, to project downwardly and depress button 12 to operate the shutter of camera 11.

From the foregoing, it will be appreciated that the limited use of camera 11 is obviated and the holder 10 may be constructed easily and quickly with a small member of inexpensive component parts. In addition, the rectangular cross section of medial portion 19 of U-shaped member 16, by fitting contiguous to the substantially flat surface of camera 11, prevents rotation of support 10 about the axis of button 12 or loop 14.. Note will be taken that translational movement in the plane of loop 14 is prevented by its contiguous fit around projection 13 of camera 11. Support 10 is maintained in a fixed position such that movement along the axis of button 12 or loop 14 is prevented by the position of loop 14 in contact with the upper surface of camera 11 and by the contact of pad 21 on lower leg 18 with the lower surface of the camera 11. Hence, the device of the present invention provides means by which timer 23 or cable 24 may be held in a substantially fixed position relative to button 12. Loop 14 may of course be U-shaped and the word "loop" is therefore hereby defined for use herein as covering the loop 14 as well as U-shaped spring clip such as is conventionally employed to hold cartridge fuses. Alternatively, such a clip might also have a circular rather than a rectangular cross section. The same is true of loop 14. Loop 14 also need not be circular to fit projection 13.

Although only one specific embodiment of the invention has been illustrated and described herein, many changes and modifications of the invention will of course suggest themselves to those skilled in the art. However, the embodiment shown and described herein was selected for this disclosure for purpose of illustration only. Hence, the invention is not to be limited thereto, the true scope of the invention being defined only in the appended claims.

What is claimed is:

1. A shutter actuator mechanism support for a camera having a movable projection for operating the shutter thereof, said support comprising: a substantially U-shaped member having an upper leg to extend over the top of the camera, a medial portion to extend downwardly along the side of the camera, and a lower leg to extend under the bottom of the camera, said upper leg having means for connection with a shutter actuating mechanism, said medial portion being bent in a direction away from said legs, whereby it may be sprung to a shape such that it may be mounted around on the camera; and a loop fixed to said member in a plane substantially perpendicular to said medial portion in a position under said upper leg to surround said projection.

2. A shutter actuator mechanism support for a camera having a movable projection for operating the shutter thereof, said support comprising: a substantially U-shaped member having an upper leg to extend over the top of the camera, a medial portion to extend downwardly along the side of the camera, and a lower leg to extend under the bottom of the camera, said upper leg having a hole extending vertically therethrough tapped with helical type screw threads; and a loop fixed to said member in a plane substantially perpendicular to said medial portion in a position under said upper leg to surround said projection.

3. A shutter actuating mechanism support for a camera having a movable projection for operating the shutter thereof and fixed projection means adjacent said movable projection, said support comprising: a substantially U-shaped member having an upper leg to extend over the top of the camera, a medial portion to extend downwardly along the side of the camera, and a lower leg to extend under the bottom of the camera, said upper leg having a hole extending vertically therethrough tapped with helical type screw threads; and a loop fixed to said member in a plane substantially perpendicular to said medial portion in a position under said upper leg to surround said fixed projection means.

4. A shutter actuating mechanism support for a camera having a movable projection for operating the shutter thereof and a cylindrical projection surrounding said movable projection, said support comprising: a substantially U-shaped member having an upper leg to extend over the top of the camera, a medial portion to extend downwardly along the side of the camera, and a lower leg to extend under the bottom of the camera, said upper leg having means for connection with a shutter actuating mechanism, said upper leg having a hole extending vertically therethrough tapped with helical type screw threads; and a cylindrical loop fixed to said member in a plane substantially perpendicular to said medial portion in a position under said upper leg, said loop being cylindrical to fit contiguously around said cylindrical projection.

5. A shutter actuator mechanism support for a camera having a movable projection for operating the shutter thereof, said support comprising: a substantially U-shaped member having an upper leg to extend over the top of the camera, a medial portion to extend downwardly along the side of the camera, and a lower leg to extend under the bottom of the camera, said upper leg having means for connection with a shutter actuating mechanism, said upper leg having a hole extending vertically therethrough tapped with helical type screw threads; and a loop fixed to said member in a plane substantially perpendicular to said medial portion in a position under said upper leg to surround said projection, said medial portion having a substantially rectangular cross section to fit against the side of the camera to prevent rotation thereof.

6. A shutter actuating mechanism support for a camera having a movable projection for operating the shutter thereof and fixed projection means adjacent said movable projection, said support comprising: a substantially U-shaped member having an upper leg to extend over the top of the camera, a medial portion to extend downwardly along the side of the camera, and a lower leg to extend under the bottom of the camera, said upper leg having means for connection with a shutter actuating mechanism, said upper leg having a hole extending vertically therethrough tapped with helical type screw threads; and a loop fixed to said member in a plane substantially perpendicular to said medial portion in a position under said upper leg to surround said fixed projection, said medial portion having a substantially rectangular cross section to fit against the side of the camera to prevent rotation thereof.

7. A shutter actuating mechanism support for a camera having a movable projection for operating the shutter thereof and a cylindrical projection surrounding said movable projection, said support comprising: a substantially U-shaped member having an upper leg to extend over the top of the camera, a medial portion to extend downwardly along the side of the camera, and a lower leg to extend under the bottom of the camera, said upper leg having means for connection with a shutter actuating mechanism, said upper leg having a hole extending vertically therethrough tapped with helical type screw threads; and a cylindrical loop fixed to said member in a plane substantially perpendicular to said medial portion in a position under said upper leg, said loop being cylindrical to fit contiguously around said cylindrical projection, said medial portion having a substantially rectangular cross section to fit against the side of the camera to prevent rotation thereof.

References Cited by the Examiner

UNITED STATES PATENTS

| 1,866,588 | 7/32 | Warren | 95/53 |
| 2,650,501 | 9/53 | Murray | 95/53 X |
| 2,679,186 | 5/54 | Schulte | 95/53 |

FOREIGN PATENTS

| 507,870 | 9/30 | Germany. |

NORTON ANSHER, *Primary Examiner.*

JOHN M. HORAN, *Examiner.*